No. 643,546. Patented Feb. 13, 1900.
W. H. H. SISUM.
MACHINE FOR MAKING MATCH SPLINTS.
(Application filed Feb. 25, 1895. Renewed Oct. 19, 1899.)

(No Model.) 3 Sheets—Sheet 1.

Witnesses:
Jas. E. Hutchinson.
Henry C. Hazard.

Inventor.
William H. H. Sisum
by Pringle and Russell
his Attorneys

No. 643,546. Patented Feb. 13, 1900.
W. H. H. SISUM.
MACHINE FOR MAKING MATCH SPLINTS.
(Application filed Feb. 25, 1895. Renewed Oct. 19, 1899.)

(No Model.) 3 Sheets—Sheet 2.

Witnesses:
Jas. E. Hutchinson.
Henry C. Hazard.

Inventor.
William H. H. Sisum
by Russell Russell
his attorney

No. 643,546. Patented Feb. 13, 1900.
W. H. H. SISUM.
MACHINE FOR MAKING MATCH SPLINTS.
(Application filed Feb. 25, 1895. Renewed Oct. 19, 1899.)
(No Model.) 3 Sheets—Sheet 3.
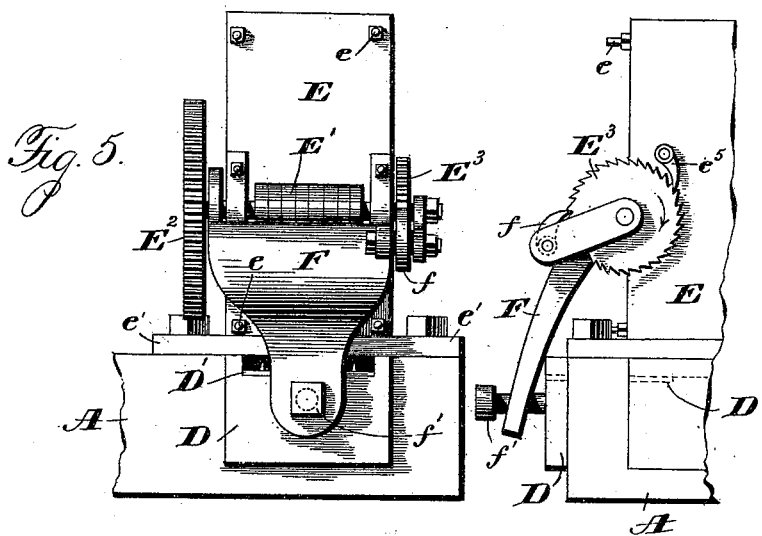
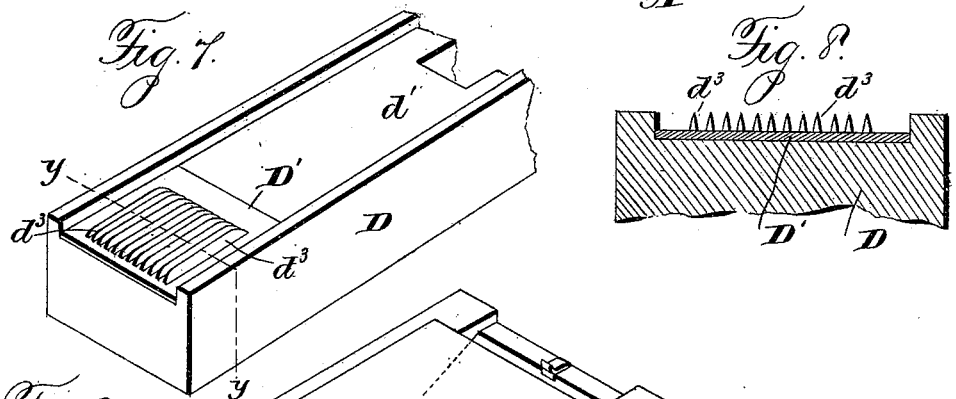
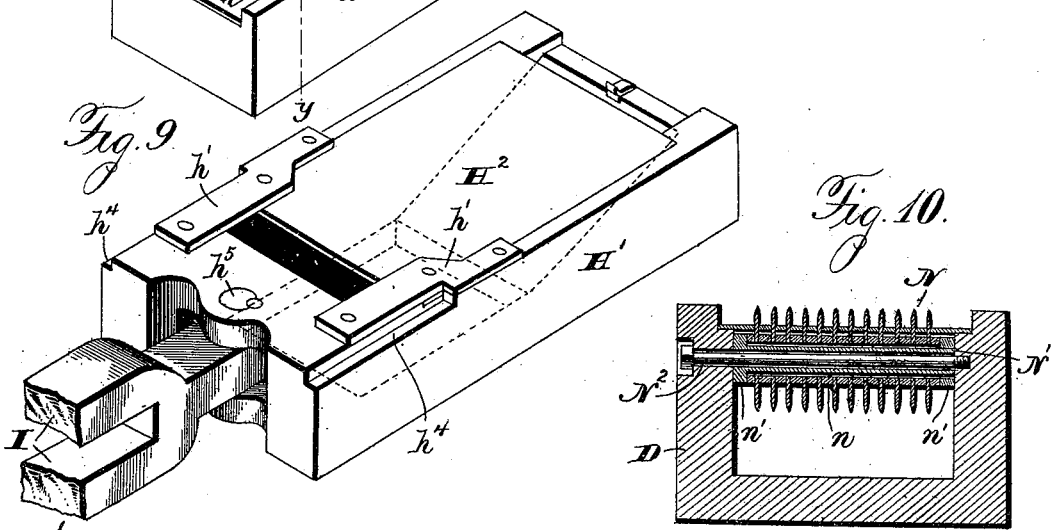
Witnesses:
Jas. E. Hutchinson.
Henry C. Hazard.
Inventor.
William H. H. Sisum
by Pringle and Russell
his Attorneys

UNITED STATES PATENT OFFICE.

WILLIAM HENRY HARRISON SISUM, OF BELLEVILLE, NEW JERSEY, ASSIGNOR TO THE DIAMOND MATCH COMPANY, OF CHICAGO, ILLINOIS.

MACHINE FOR MAKING MATCH-SPLINTS.

SPECIFICATION forming part of Letters Patent No. 643,546, dated February 13, 1900.

Application filed February 25, 1895. Renewed October 19, 1899. Serial No. 734,135. (No model.)

*To all whom it may concern:*

Be it known that I, WILLIAM HENRY HARRISON SISUM, of Belleville, in the county of Essex, and in the State of New Jersey, have invented certain new and useful Improvements in Machinery for Making Match-Splints, Toothpicks, &c.; and I do hereby declare that the following is a full, clear, and exact description thereof, reference being had to the accompanying drawings, in which—

Figure 1:
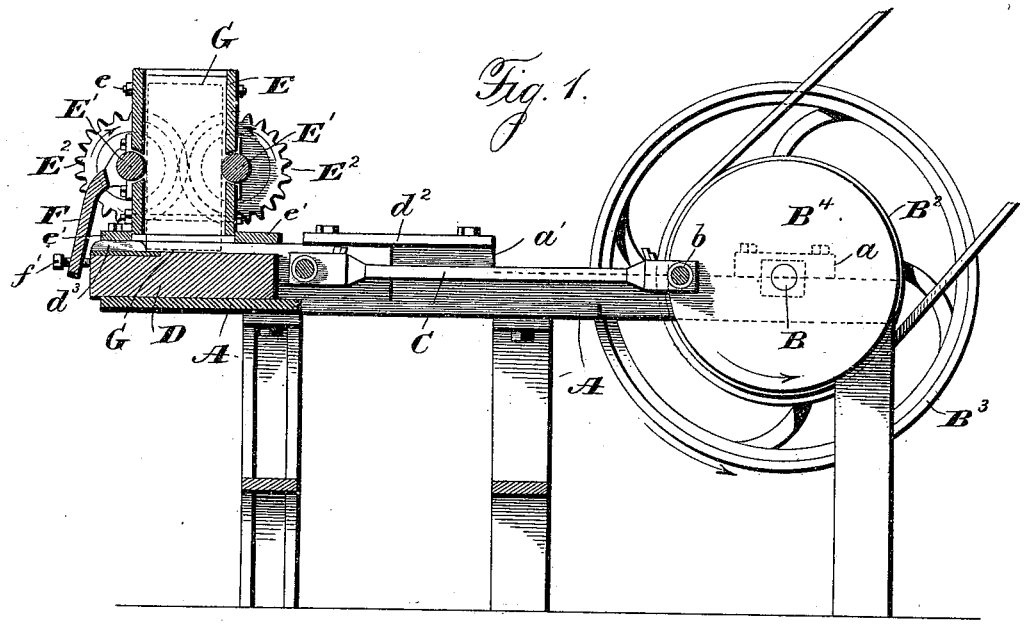
Figure 2:
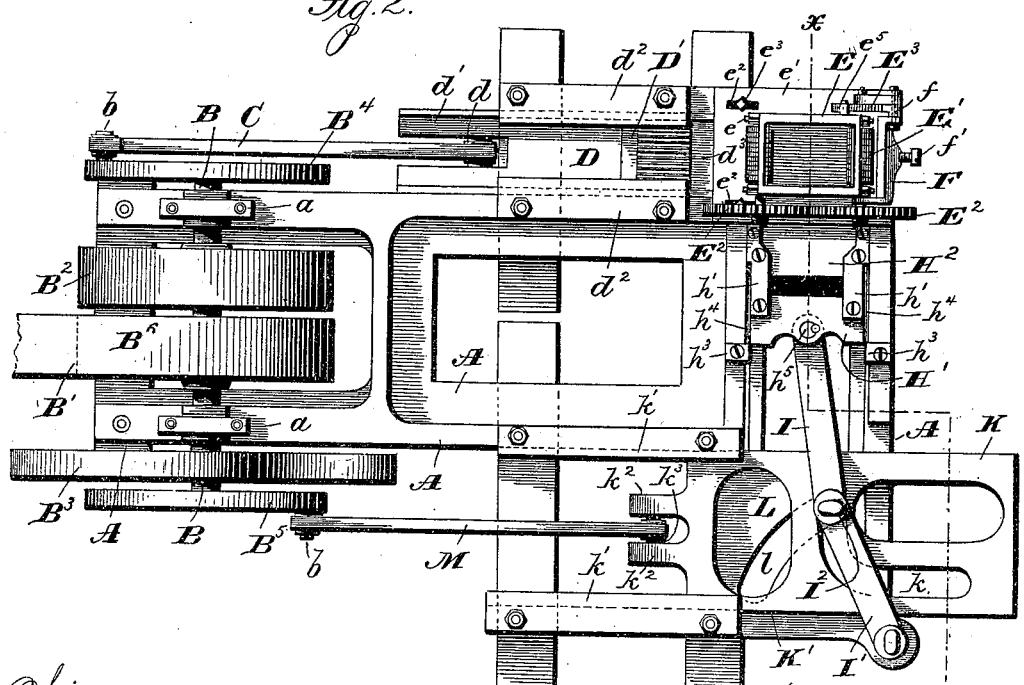
Figure 3:
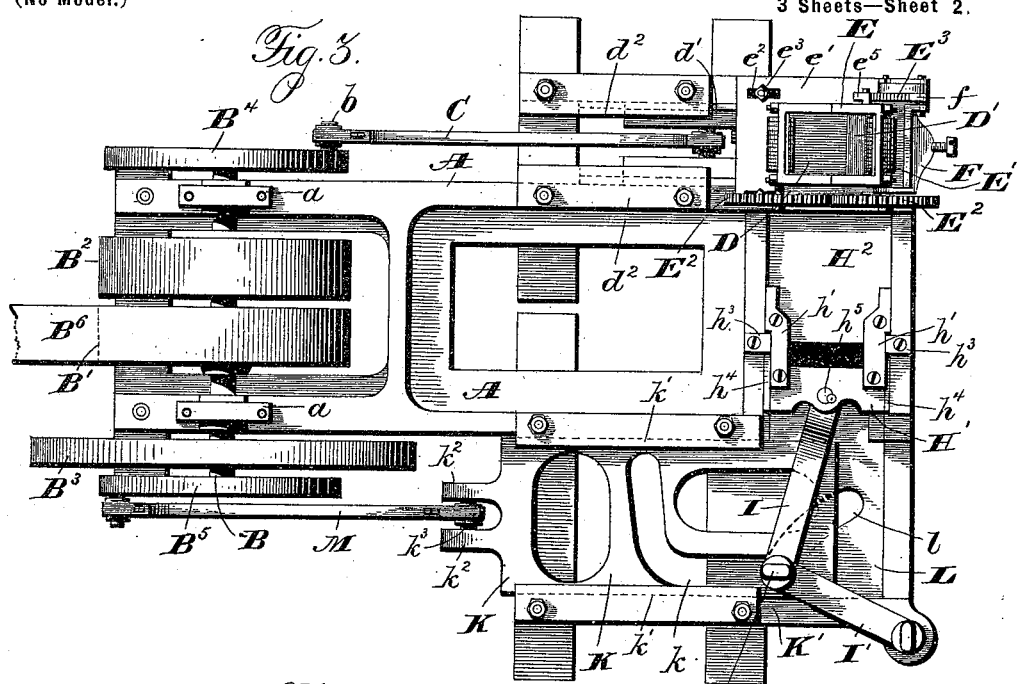
Figure 4:
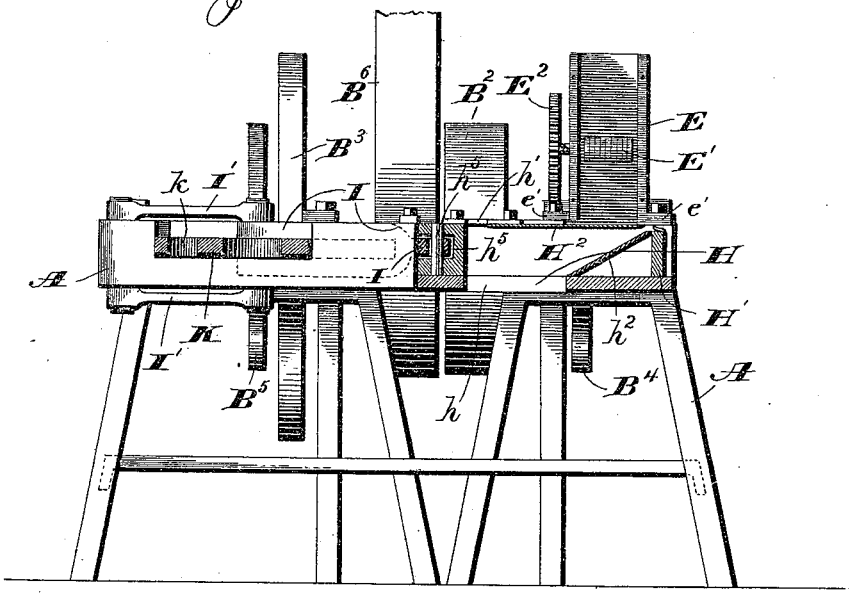

Figure 1 shows a view of a vertical section of my machine on line $w$ $w$ of Fig. 2; Fig. 2, a plan view of my machine; Fig. 3, a similar view with the parts in position as when the block carrying the slicing-knife is drawn back ready for a cutting stroke; Fig. 4, a view of a section on line $x$ $x$ of Fig. 2; Fig. 5, a detail view, on an enlarged scale, showing the feeding mechanism for the block being cut; Fig. 6, a similar view of such mechanism looking at the side at right angles to that shown in Fig. 5; Fig. 7, a detail perspective view of the cross-head carrying the scoring-knives; Fig. 8, a view of a section on line $y$ $y$ of Fig. 7; Fig. 9, a detail perspective view of the head carrying the slicing-knife; and Fig. 10, a detail sectional view of the scorer-carrying head, with a modification of the scoring-knives.

Letters of like name and kind refer to like parts in each of the figures.

The object of my invention has been to provide an improved machine for cutting match-splints, toothpicks, and the like from a block of wood; and to this end my invention consists in the machine and in the parts thereof constructed, arranged, and combined as hereinafter specified.

In the drawings, A A designate the supporting-frame, which can be of any suitable form, construction, and material. As shown, it consists of a table or bed supported upon several uprights suitably braced, which can rest upon or be secured to any desired foundation. Journaled in bearings $a$ $a$ on this frame is the shaft B, carrying the fixed pulley B', the loose pulley B², and the fly-wheel B³ and provided at or near its opposite ends with the crank-disks B⁴ and B⁵, respectively, having their crank-pins $b$ $b$ situated diametrically opposite each other, as shown best in Figs. 2 and 3.

A belt B⁶, to be driven from any desired motor or source of power, serves to drive the pulley B' and can be shifted to the loose pulley B² when the machine is to be thrown out of operation.

Connected with the crank-pin $b$ on disk B⁴ is the pitman C, whose other end is pivotally connected with the sliding block or cross-head D by the pin or short shaft $d$. Such block or head D is guided and slides in a way $a'$ on the bed part of the frame and, having in its upper face a longitudinal groove $d'$, is held down in said way $a'$ by plates $d^2$ $d^2$, attached to the frame A and overlapping the portions of the head at the sides of groove $d'$. At the forward end of such groove is the plate D', sunk so as to have its upper face flush with the groove-bottom and carrying the upright longitudinal scoring-blades $d^2$ $d^2$, of a height equal to the thickness of the splints or toothpicks to be cut and at a distance apart equal to the width of the strips which are to form the splints or picks. At their ends they are rounded or beveled off, so that the lines of their edges will be inclined downward and toward the plate D', the object of such construction being to secure the easiest passage of the blades through the block of wood held in their path as they move back and forth with head D. The blades will then enter the wood with a shearing cut and pass in easily through the same as it is held by the means to be described hereinafter. Situated over the path of these scoring-blades as the head D reciprocates is the upright box E, open at top and bottom, whose interior is of the size and shape to easily receive and hold a block of the wood from which the splints or toothpicks are to be cut. While it is to be made to fit around the block closely enough to hold it from any turning motion as the scoring-blades are being passed through its lower portion, this box may be made high enough to accommodate several blocks placed on top of each other instead of only one at a time. As shown, it is made in two parts, the plane of division being a vertical one midway between the front and rear sides, so that each part consists of one side and halves of two others. Bolts $e\ e$ serve to hold the two parts of the feed-box thus formed together.

At their bottoms the box-sections are provided with fastening-flanges $e'$, secured to the frame on opposite sides of the guideway for the scorer-head D. The flange on the inner half of the box is provided with slots $e^2\ e^2$ for the fastening-bolts $e^3\ e^3$, so that such half may be adjusted to or from the other to regulate the space within the box to suit blocks of wood of different widths.

Journaled in suitable bearings on the front and rear sides of the feed-box with reference to the travel of the head D are the shafts of the feed-rolls $E'\ E'$, which have their peripheries projecting in through slots $e^4\ e^4$ in the box sides adapted to take hold of the sides of a block of wood, so as to move it downward as the rolls turn in the direction indicated by the arrows. At one end both of the shafts of these rolls are provided with gear-wheels $E^2\ E^2$, which intermesh, so as to cause the rolls to rotate together. On the other end of the outer or rear roll shaft is a ratchet-wheel $E^3$, engaged by a stop-pawl $e^5$, so that the shaft and roll thereon are prevented from turning back in a direction opposite to that indicated by the arrow. Pivoted upon this same shaft at or near its opposite ends is the lever F, carrying the pawl $f$, which engages the teeth of the ratchet-wheel, so as to turn the latter as the lever is swung upward and outward. In order that this lever may be given this motion each time that the scorer-knife-carrying head reaches the limit of its forward movement to carry its knives through the block of wood G, held in the feed-box E and gripped between feed-rolls $E'\ E'$, the outer and lower end of the lever is provided with a bearing to be engaged by a portion of head D, as shown in Fig. 6. This bearing is preferably made adjustable, so that the amount of throw of the lever, and consequently the extent of rotation of the feed-rolls $E'\ E'$ at the completion of each outward motion of head D, may be adjusted at will. As shown, such bearing consists of the screw $f'$, tapped through the lever F and having its inner end in position to be engaged by a portion of head D. As the lever is swung outward by such head as the latter reaches the limit of its stroke, carrying the scoring-knives $d^2\ d^2$ beyond the block of wood in the feed-box, the pawl on the lever engages and moves the ratchet-wheel $E^3$ to revolve the feed-rolls, so as to carry their inner sides and the block gripped between the latter downward a distance dependent upon the adjustment of the bearing-screw $f'$. This distance is made equal to the thickness of the strips or splints which are to be cut. Upon their return or inward travel with the head D the scoring-knives $d^2\ d^2$ will pass through and score the lower part of the block of wood, so that if a strip or sheet of wood of the thickness of the desired strips or splints be subsequently split or cut off from the block-face the result will be a series of straight uniform separated strips for use as match-splints or otherwise. Beneath the lower end of the feed-box is another way H at right angles to the one in which head D slides, in which is guided and slides the head $H'$, carrying the horizontal slicing-knife $H^2$, wide enough to cut off from the lower part of the block G a strip or sheet of the full width of such block. This head is in the shape of a rectangular box with open top and an opening $h$ in its bottom. The knife $H^2$ is attached to the rear or inner part of the head by metal plates $h'\ h'$, bolted to head and knife, and extends forward over the top of the space within said head nearly to the forward or outer end thereof, where it is provided with a cutting edge. This end of the head has its upper portion cut away to a plane well below the under face of the knife $H^2$, so as to allow the passage of a strip or sheet cut from the block being acted upon, and a guide-plate $h^2$ extends downward and inward from the upper edge of the cut-away part of the head to the opening $h$, so as to guide the part cut from the block down and out through such opening.

Guide-cleats $h^3\ h^3$, bolted to the bed or table of the frame on each side of way H, extend down close to the sides of the way into grooves $h^4\ h^4$ on the sides of the head $H'$, so as to hold the latter down in place within the said way while it reciprocates.

Pivotally connected at one end with the head by pin $h^5$ is the link I, which having its body forked to extend above and below the reciprocating slotted plate K, sliding in guide-way $K'$ on the machine-frame A A, has its other end pivotally connected with the two links $I'\ I'$ by a pin $I^2$, passing through suitable eyes in such links and the ends of the fork-arms on link I. At their outer ends links $I'\ I'$ are pivoted to the frame at a point to one side of the line of travel of the point at which the link I is connected with head $H'$. This construction makes a toggle whose ends are connected, respectively, with the head $H'$ and a fixed point on the frame. The center pin $I^2$ of this toggle passes through the cam-slot $k$ in reciprocating plate K and also through the curved slot $l$ in the plate L, which is fixed upon or forms part of the frame of the machine. This slot $l$ is curved on the arc of a circle struck from the pivotal point of the outer end of one of the links $I'$ as a center, so that the inner ends of such links can swing from a point nearly in a line between the outer pivotal point of the links and the place where the link I is connected with head $H'$, all as indicated in Figs. 2 and 3.

The guideway $K'$ for plate K extends in a direction at right angles to the line of the travel of head $H'$, and said plate is held down in place therein by the strips $k'\ k'$, attached to the frame and overlapping the upper face of the plate. To secure reciprocation of this plate, so that it will always move in a direction opposite to that in which head D is moving, I provide the pitman M, which is pivotally connected at its opposite ends with the plate and the crank-pin $b$ on crank-disk $B^5$. The plate has two ears $k^2$ $k^2$, engaged by the pivot-pin $k^3$, which also engages a suitable eye or bearing on the end of the pitman, between said ears.

The cam-slot $k$ is in general shape a right-angled one, having one portion, near its outer side, parallel with the line of travel of plate K, and the other portion, nearly at a right angle thereto, extending toward the head H' from the end of the other portion, which is nearest to the point where pitman M is connected with the plate. These two portions of the slot are connected by a short curved part, as shown. The outer slot portion, which is parallel to the line of movement of the plate, is so situated that on the inward motion of the plate it passes over the outer end of the curved slot $l$, while the outer portion is so situated that its end will stand over the inner end of curved slot $l$ when the plate K is at the limit of its outward travel, as shown in Fig. 2. With the parts in such position and the toggle-pin $I^2$ passing through the inner ends of the two slots $k$ and $l$ the head H' is at the limit of its forward throw, with the edge of the slicing-cutter beyond the outer side of the block held in the feed-box, while the head D, with its scoring-knives, is drawn back to carry such knives away from the path of head H' and from the block G. The first rearward movement of plate K then causes the toggle-pin $I^2$ to move rearward and outward along the curved slot $l$, and consequently along the portion of the slot $k$ which is at right angles to the line of travel of plate K. This movement of the pin flexes the toggle and quickly draws the link I and the head H' back to take the slicing-knife from under block G during the first part of the motion of plate K and before the head D, with its scoring-knives, has by its connection with the crank-disk $B^4$ been carried under the block. Continued rotation of the shaft B then causes the plate K to continue its backward motion, but without any further flexing of the toggle, for the longitudinal part of the slot $k'$ now accommodates the pin $I^2$ and allows motion of the plate without changing the position of such pin. The head D, with its scoring-knives, is now being moved forward to carry such knives past the under side of the block G, gripped by the feed-rolls in the feed-box. As the head approaches the limit of its travel in this direction it strikes the bearing-screw on the lever F and swinging the latter outward and upward causes its pawl $f$ to turn the ratchet-wheel $E^3$, and consequently the feed-rolls E' E', a distance sufficient to feed the wood block G down into position for the scoring and cutting off of a new series of strips or splints. The crank-pins $b$ $b$ on crank-disks $B^4$ $B^5$ then cause their respective pitmen, and consequently the connected head D and plate K, to reverse their movements, the former traveling back and inward to carry its scoring-knives through the under portion of the block G, while the longitudinal part of slot $k$ on plate K is being carried along past the toggle-pin $I^2$ and before such pin is engaged by the inner side of the other part of said slot and caused to move in along slot $l$ to force link I and head H' forward again toward and through the scored part of the block. On account of the abrupt bend in slot $k$ this movement of toggle-pin, link I, and head H' is a quick one, taking place and being completed during the latter portion of the forward or outward travel of the plate K after the scoring-knives or head D have been withdrawn from the path of slicing-cutter $H^2$.

With the block G placed in the feed-box between feed-rolls E' E' so that its grain is parallel with the scoring-knives such knives will easily cut or score the lower portion of such block to separate by the scoring strips of the width of the desired splints or toothpicks, and the slicing-knife cutting at right angles to the scoring will shave off the divided strips of the required thickness, which will pass down incline $h^2$ through the opening $h$ into any suitable receptacle.

With the slicing-knife held horizontal or parallel to the under face of the block and moved through the latter in a direction at right angles to the grain and to the travel of the scoring-knives the splints or strips will always have their upper and lower sides parallel and will be uniform in shape, since there is no chance for irregular splitting of the strips from the block, as there would be if the slicing knife or cutter should be made to travel in the same line with the scoring-knives and should begin the separation of the splints from the block at one end. With the slicing-cutter acting in this latter way there is no opportunity for any irregularity in the grain to cause a splitting off, which would make the splint irregular on its upper side and thicker in one part than in another. By my construction and manner of using the slicing-knife I remove any chance of such irregularity, for the cut which separates a splint from the block is always and throughout the length of the splint in the plane of the edge of the slicing-knife.

While I prefer to use the simple scoring-blades shown in Figs. 7 and 8, I contemplate using instead, where desired, the modified form of scoring devices shown in Fig. 10. In this modification the plate D' on the head D is slotted, and up through such slots project the upper portions of rotary knives N, which are journaled upon the tubular shaft N', supported on the rod $N^2$, carried by the head D. Between these knives are the annular distance-pieces $n$ $n$, which can, if desired, be made in the form of hubs on the sides of the knives. Collars $n'$ $n'$, between the outer hubs or distance-pieces and the sides of the cavity in the head D, serve to keep such hubs or pieces in place and out of contact with said sides. These rotary cutters will as the head is reciprocated to carry them past the block G cut the latter and score it most easily with parallel scores to determine the widths of the splints to be cut off by the slicing-knife.

In order that the adjustment of the size of the feed-box to suit any required length of block, heretofore referred to, may be made without the risk of interfering with the proper simultaneous action of the feed-rolls, the intermeshing gear-wheels on the axles of such rolls are made removable, so that they can be replaced with ones of different size, as may be required to insure the intermeshing when the box is lengthened or shortened, as desired.

My machine, as shown and described hereinbefore, is simple and cheap in construction, positive in all its actions, and adapted to continue the cutting of regular and uniform strips for match-splits or toothpicks as long as the required blocks of wood are fed into the grip of the feed-rolls on the feed-box. The attendant has but to feed the blocks into the feed-box in proper position, with the grain parallel to the travel of the scoring-knives, and the mechanism will automatically produce the strips or splints perfectly uniform in all their dimensions.

Having thus described my invention, what I claim is—

1. In a machine for making strips of wood for match-splints, &c., the combination of means for scoring the face of a block, a sliding knife for severing the scored face, having a cutting edge that is at a right angle to the line of travel of the knife, and parallel with the scored lines of the block, a toggle connected at one end with said knife, and at the other end to a relatively-fixed point, substantially in line with the line of travel of the knife, a slide reciprocating in a direction that intersects the line of travel of the knife, and a part between the ends of the toggle that engages a cam-slot in the slide, substantially as and for the purpose described.

2. In a machine for making strips of wood for match-splints, &c., the combination of means for scoring the face of a block, a sliding knife for severing the scored face having a cutting edge that is at a right angle to the line of travel of the knife and parallel with the scored lines of the block, a toggle connected at one end with said knife, and at the other end to a relatively-fixed point substantially in line with the line of travel of the knife, a slide reciprocating in a direction that intersects the line of travel of the head, having a cam-slot, and an extension from the pivot of the toggle-links, into said slot, substantially as and for the purpose described.

3. In a machine for making strips of wood for match-splints, toothpicks, and the like, in combination with a holder for block of wood, the reciprocating head carrying the scoring-knives, the second reciprocating head carrying the slicing-knife, a toggle pivotally connected at one end with this head, and, at the other, to a support beyond the head, a stationary piece having a curved slot engaged by a pin connected with the inner ends of the links of the toggle, the reciprocating plate having the slot also engaged by the pin, such slot having one portion longitudinal with reference to the travel of the plate, and another portion at an angle to the other, and means for reciprocating the scorer-carrying head and the slotted plate, substantially as and for the purpose shown.

4. In a machine for making strips of wood for match-splints, toothpicks, and the like, in combination with means for holding a block of wood, the reciprocating head carrying the scoring-knives, the second reciprocating head carrying the slicing-knife, the toggle having its opposite ends pivotally connected, respectively, with the latter head and a support outside of the same, a stationary piece having a curved slot through which the pin connecting the links of the toggle passes, the reciprocating plate having the pin-engaging slot, with one portion longitudinal, with reference to the travel of the plate, and another portion extending at an angle thereto, toward the head to which the toggle is connected, and means for reciprocating the plate and the head carrying the scoring-knives, substantially as and for the purposes shown and described.

In testimony that I claim the foregoing I have hereunto set my hand this 23d day of February, 1895.

WILLIAM HENRY HARRISON SISUM.

Witnesses:
JOS. WILKINSON,
JNO. J. DUFF.